(12) United States Patent
Kepeklian

(10) Patent No.: US 10,657,155 B2
(45) Date of Patent: May 19, 2020

(54) DEVICE FOR PROCESSING LARGE-SCALE DATA STREAMS

(71) Applicant: ATOS INTEGRATION, Bezons (FR)

(72) Inventor: Gabriel Kepeklian, Beauchamp (FR)

(73) Assignee: ATOS INTEGRATION, Bezons (FR)

( * ) Notice: Subject to any disclaimer, the term of this patent is extended or adjusted under 35 U.S.C. 154(b) by 112 days.

(21) Appl. No.: 15/850,060

(22) Filed: Dec. 21, 2017

(65) Prior Publication Data

US 2018/0218061 A1    Aug. 2, 2018

(30) Foreign Application Priority Data

Dec. 30, 2016   (FR) ..................... 16 63537

(51) Int. Cl.
| | | |
|---|---|---|
| *G06F 17/00* | (2019.01) | |
| *G06F 16/28* | (2019.01) | |
| *G06F 16/81* | (2019.01) | |
| *G06F 16/2455* | (2019.01) | |
| *G06F 16/25* | (2019.01) | |

(52) U.S. Cl.
CPC ...... *G06F 16/283* (2019.01); *G06F 16/24568* (2019.01); *G06F 16/25* (2019.01); *G06F 16/81* (2019.01)

(58) Field of Classification Search
CPC .. G06F 16/283; G06F 16/24563; G06F 16/81; G06F 16/25

USPC .................................. 707/600–899
See application file for complete search history.

(56) References Cited

U.S. PATENT DOCUMENTS

2011/0098056 A1*  4/2011  Rhoads .................. G01C 21/20
                                                      455/456.1

OTHER PUBLICATIONS

Wiederhold, "Mediators in the architecture of future information systems", Computer, IEEE Computer Society, USA, vol. 25, No. 3, Mar. 1, 1992, pp. 38-49, XP011416460, ISSN: 0018-9162, DOI: 0.1109/2.121508.

* cited by examiner

*Primary Examiner* — Isaac M Woo
(74) *Attorney, Agent, or Firm* — Hauptman Ham, LLP

(57) ABSTRACT

The present invention relates to a device for processing large-scale data streams (big data), comprising a knowledge base, a hardware and software assembly constituting a front-end communication device for capturing the streams of the external medium and if needed restoring data to this medium, the front-end delivering the streams to a platform where it undergoes different processings, traces are collected and stored in a storage and memory architecture during execution of processing operations, the platform producing data which supply a decision-making device comprising a hardware and software assembly defining decision rules for either triggering actions or initiating retroactions to the front-end communication device or to the knowledge base of said processing device.

14 Claims, 1 Drawing Sheet

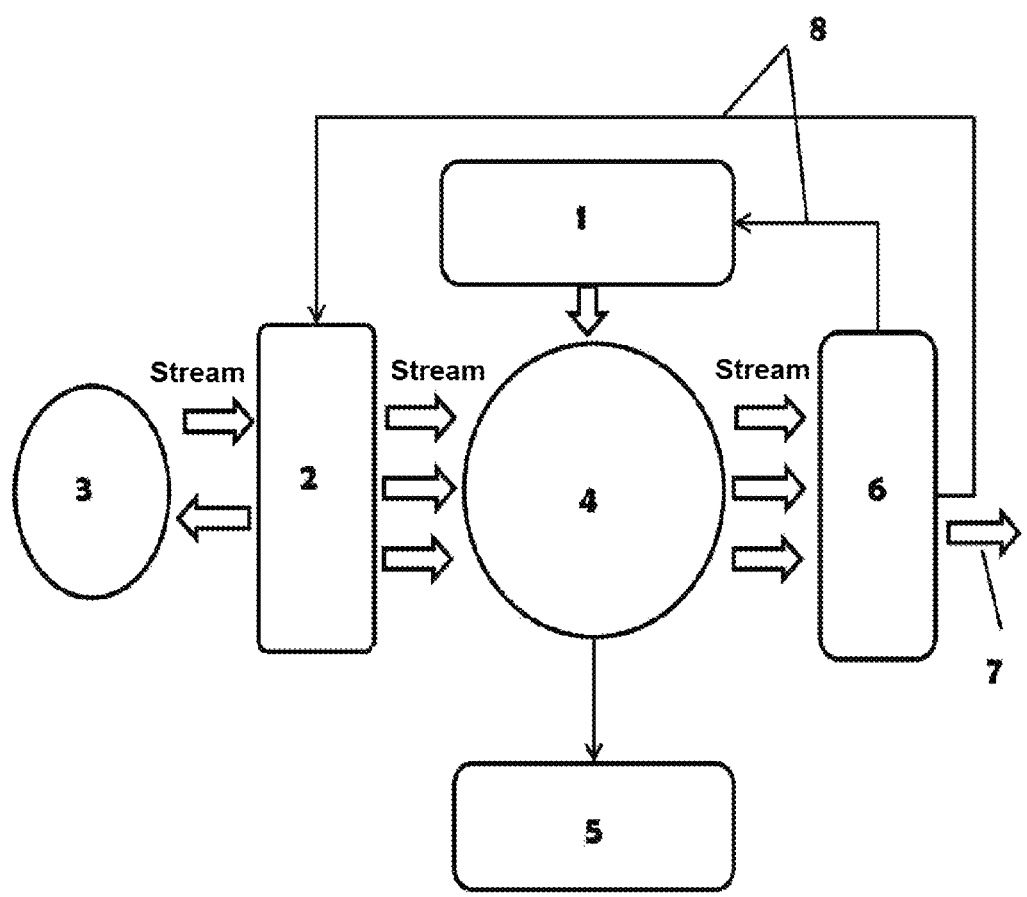

DEVICE FOR PROCESSING LARGE-SCALE DATA STREAMS

TECHNICAL FIELD OF THE INVENTION

The present invention relates to the field of data processing and more specifically a device for processing considerable volumes of data.

TECHNOLOGICAL BACKGROUND OF THE INVENTION

Everywhere in the definitively digital world of today, data constitute primary material. The flood of information creates new opportunities, such as business. These mass data redefine the way scientific knowledge is created and also offer companies new growth levers.

The crossing of data streams which now irrigate many sectors, in particular the economic field, must access information of an inaccessible systemic nature in each data stream taken singly. The semantic Web offers a framework for implementing this crossing.

The standards of the semantic web are starting to be widely disseminated and stabilised (RDF, OWL for representation of data and metadata, as well as protocols for exchanges, essentially HTTP). They were created for easier interoperability and data exchange. The Web has effectively become the preferred source of data and the most dynamic site for exchanges. The provision and promotion of open or semi-open public data, their combining with industrial data and the tools for exploiting them are progressive drivers in the emergence of a major lever for dynamising the economic sector, for instance.

The work of collection, integration, analysis, use and viewing of data is being systematised by many players. Today it relates largely to "cold" data or those evolving minimally over time. But a new interest is manifesting for "hot" data, therefore close to real time, which pose new problems and require new approaches.

Some components or tools for processing Open Source or commercial data streams already exist. This is the case, for example, for triple stores and execution engines of SPARQL requests (request language).

But, with current volumes of data streams, their number and their variety, current techniques and tools are no longer capable of responding to user demand.

GENERAL DESCRIPTION OF THE INVENTION

The aim of the present invention is to eliminate some drawbacks of the prior art on the management and processing for substantial data stream.

This aim is achieved by a device for processing large-scale data streams (big data), comprising a knowledge base, a hardware and software assembly constituting a front-end communication device, for capturing the streams of the external medium and if needed restoring data to this medium, the front-end delivering the streams to a platform where it undergoes different processings, traces being collected and stored in a storage and memory architecture during execution of the processing operations, the platform producing data which supply a decision-making device comprising a hardware and software assembly defining decision rules for either triggering actions or initiating retroactions to the front-end communication device or to the knowledge base.

According to another particular feature, the different processings comprise semantisation of the stream, or creation of a summary, or crossing of at least two streams or interconnection of several streams.

According to another particular feature, the platform comprises a plurality of "smart'op" which are processing stream processes, these processes being scripted for example via scripting means to produce data supplying the decision-making device.

According to another particular feature, storing traces in the storage architecture lets the platform access these traces and perform repetitions of any sets or non-real-time processings.

According to another particular feature, the semantisation of streams conforms to an ontology of description of streams.

According to another particular feature, the interconnection of streams can include semantic reasoning.

According to another particular feature, all operations to which the streams are subjected contribute to the production of data.

According to another particular feature, the data can be alerts or singularities resulting from reasoning conducted on the streams.

According to another particular feature, the knowledge base contains information representing the knowledge of the external medium and comprises the description of sensors and infrastructure which supports it.

According to another particular feature, this information constituting the knowledge can be modified by a retroaction triggered by decision rules (housed in the "decision-maker").

DESCRIPTION OF THE ILLUSTRATIVE FIGURES

Other particular features and advantages of the present invention will emerge more clearly from the following description given in reference to the appended drawings, in which:

FIG. 1 represents the diagram of a system for processing data streams comprising at least one device and a platform for processing streams, according to an embodiment;

DESCRIPTION OF PREFERRED EMBODIMENTS OF THE INVENTION

The present invention relates to a device for processing substantial data streams.

In some embodiments, the device for processing large-scale data streams (big data), comprises a knowledge base (1, FIG. 1), a hardware and software assembly constituting a front-end communication device (2), for capturing the streams of the external medium (3) and if needed restoring data to this medium, the front-end delivering the streams to a platform (4) where it undergoes different processings, traces of activity are collected and stored in a storage and memory architecture (5) during execution of processing operations, the platform (4) producing data which supply a decision-making device (6) comprising a hardware and software assembly defining decision rules for either triggering actions (7) or initiating retroactions (8) to the front-end communication device (2) or to the knowledge base (1) of said device.

The device for processing data stream and the platform (4) allow users to effectively manage their own data stream and those produced in their field of activity by other players (partners, providers, clients, institutions, agencies, etc.). These data also comprise open data (Open Data), linked (Linked Open Data) or not, which are produced by international communities or private organizations.

The language or format or model used for description of data in the platform (4) is preferably RDF (Resource Description Framework). The RDF (graph) model formally describes the Web resources and their metadata to enable automatic processing of such descriptions. A document structured in RDF is a set of triplets. An RDF triplet is an association (subject, predicate, object):

the "subject" represents the resource to be described;
the "predicate" represents a type of property applicable to this resource;
the "object" represents a datum or another resource, the value of the property.

The subject, and the object in the case where it is a resource, can be identified by a URI (uniform resource identifier) or anonymous nodes. The predicate is necessarily identified by a URI.

RDF documents can be written in different syntaxes, including in XML. But RDF per se is not an XML dialect. It is possible to employ other syntaxes to express triplets. RDF is simply a data structure constituted by nodes and organized in a graph. Even though RDF/XML—its XML version proposed by the W3C (World Wide Web Consortium)—is only a syntax (or serialization) of the model, it is often called RDF. At the same time, an abuse of language designates the graph of triplets and the XML presentation which is associated with it.

An RDF document formed in this way corresponds to a label-oriented multi-graph. Each triplet corresponds to an oriented arc whereof the label is the predicate, the node source the subject and the target node the object.

The description of documents and or data in RDF is generally based on an ontology or a set of ontologies. An ontology is structured set of terms and concepts representing the meaning of a field of information, whether via the metadata of a namespace, or the elements of a field of knowledge. Ontology constitutes per se a data model representative of a set of concepts in a field, as well as relations between these concepts. It is used to reason on objects of the relevant field.

The concepts are organized in a graph and are linked to each other by taxonomic relations (ranking of concepts) on the one hand and semantic on the other.

This definition makes it possible to write languages intended to implement ontologies. There are at least three of these notions for constructing an ontology:

determination of passive or active agents;
their functional and contextual conditions;
their possible transformations to limited aims.
To model an ontology, these tools will be used to:
refine the adjacent vocabularies and notions;
decompose into categories and other subjects;
predicate to know adjacent transformations and orient to internal aims;
relativize to cover concepts;
make similar to reduce to totally separate bases;
instantiate to reproduce all of a "branch" to another ontology.

Ontologies are employed in artificial intelligence, the semantic Web, software engineering, the biomedical computing or even the architecture of information as a form of representation of the knowledge on a world or a certain part of this world. Ontologies generally describe:

individuals, constituting the base objects;
classes: constituting sets, collections, or types of objects;
attributes: comprising properties, functionalities, characteristics or parameters which the objects can have and share;
relations, constituting the links which the objects can have between them;
events representing the changes undergone by attributes or relations;
metaclass (semantic web), constituting collections of classes which share some characteristics In some embodiments, the different processings comprise semantisation of the stream, or creation of a summary, or crossing of at least two streams or interconnection of several streams.

In some embodiments, the platform (4) comprises a plurality of "smart'op" which are processing stream processes, these processes being scripted via scripting means for example and in a non-limiting way a DSL (Domain— specific language) to produce data supplying the decision-making device (6).

Scripting means programming by means of scripts. A script is defined as a program in interpreted language.

In some embodiments, storing traces in the storage architecture lets the platform (4) access these traces and perform repetitions of any sets or non-real-time processings.

Repetition of sets or replay, means the operation which consists of having processing previously carried out "redone" and the traces of activity of which have been preserved.

In some embodiments, the semantisation of streams conforms to an ontology of description of streams.

In some embodiments, the interconnection of streams can include semantic reasoning.

In some embodiments, all operations to which the streams (passing through the platform (4)) are subjected contribute to the production of data (streams entering the "decision-maker" (6), see FIG. 1).

In some embodiments, data can be alerts or singularities resulting from reasoning conducted on the streams.

In some embodiments, the knowledge base contains information representing the knowledge of the external medium and comprises the description of sensors and infrastructure which supports it.

In some embodiments, this information constituting the knowledge can be modified by a retroaction (8) triggered by decision rules (housed in the "decision-maker" (6)). For example and in a non-limiting way, on discovering that a sensor is defective the "decision-maker" (6) updates the knowledge bases. The "decision-maker" (6) can also transmit data to the external medium (3) by communicating with the "front-end" (2), as shown in FIG. 1.

In some embodiments, the platform (4) has a modular architecture for supporting the addition or replacement of (new) components without recompilation and enables deployment on a park of trivialized virtual machines ("cloud-ready"). Said platform (4) is modularized by means of abstraction layers for encapsulating all access to services of the operating (file system), storage (database, RDF triple store . . . ) or exchange (messaging bus) system.

This modular platform architecture can be based on commercial standards for inserting into user systems, in particular:

The Java platform and its ecosystem. Platforms based on Java benefit from many advantages. The execution engine, running on several operating systems, the developments in Java inherit especially an independence of the platform (4) and portability of code which is executed identically on each of them. This is an environment where there are many function libraries and frameworks available in open source, making for easy developments. Apart from the programming language, Java is above all a platform for deployment (virtual Java machine, library and application servers of the enterprise version (Java EE) which supports several types of programming: imperative (Java), dynamic/scripted (Groovy, JRuby . . . ) and functional (Scala, Closure . . . )

The standards of the W3C (World Wide Web Consortium), whether at the level of data modelling (RDF, XML), formulation of requests (querying by the SPARQL language), infrastructure (protocol HTTP, model REST) or presentation (HTML 5, CSS).

In some embodiments, replacing implementations of said abstractions passes from simple implementations adapted to development (local file system, triple store in memory, observers of events) to others focused on large-scale deployment (virtual machine park, cluster or server farm): distributed file systems of "Grid" (MongoDB, Infinispan . . . ), triple store distributed or clustered, JMS or AMQP messaging bus type, etc., In some embodiments, the architecture of the platform (4) adapts the deployment of the system to the target volumetry but also has it evolve in case of evolution, by simple addition of virtual machines if the selected components allow this or by replacing the components limiting scalability.

Another aspect of the scalability of the system relates to management of network streams and optimization of traffic to or from the system. Use of the model REST (REpresentational State Transfer) for providing services to applications and users optimizes use of the network infrastructure, both server side and client side, for example via management directives of caches (servers, networks (proxies) and client) but also avoid useless requests of content revalidation type.

Similarly, fine management of content negotiation optimizes exchanges by minimizing or even deleting the number of redirections necessary for guiding the user to the resource providing content adapted to his restrictions/capacities (MIME types).

The architecture can support interfaces necessary for this optimization of exchange streams.

Apart from the technical aspects, this task lays down rules for routing and distribution of events concerning streams so as to automate and optimize the processing distribution as a function of topology (architecture) of the platform (4) and the processing capacity of each instance of smart'op making it up. Said architecture also enables dynamic and auto-adaptive processing distribution, capable of considering events such as disappearance of a node (recovery) and its recommissioning, or even optionally introduction of a new node (hot scalability).

In some embodiments, the SPARQL request language is extended to perform summaries for data stream or implement oblivion functions for archiving data streams with a variable granularity as a function of time and ensuring limited storage space.

Summaries also specify and implement semantic filtering operators (when applied to semantised data) which on entry use the context of the user revealed by his profile, his access rights to data, his geolocation, his preferences, his terminal and his environment (time, season, etc.).

Dynamic data recovered from different sensors and other streams are semantised. This semantisation is constituted by conversion of these data into embellished RDF triplets of a time dimension which characterizes the quasi-continuous arrival of these streams.

In this way, extension of the SPARQL language by integrating notions such as the time window into it forms requests, filters or reasons on these semantised streams.

When a system needs fast and intelligent processing of voluminous data which are arriving continuously, it becomes very costly and sometimes redundant or impossible to store all streams prior to their processing. It is therefore necessary to process semantised data on the fly and store only those which are pertinent by conducting summaries (for example extracting a sample representative of the streams by statistical approaches).

In some embodiments, the SPARQL language is extended by introducing the notion of adaptable time window (defined portion of a stream) and operators specific to the stream processings. Those requests treating data must adapt to the rate of arrival of the dynamic data and be evaluated continually so as to consider the scalable character of the stream. The semantics of SPARQL requests enable processing based on time or order of arrival of data.

In some embodiments, the extended SPARQL language involves data which can be either static or dynamic and temporal by interconnecting them, irrespective of their number, their sources or their qualities.

In the context of the Semantic Web, the facts stored in knowledge bases are naturally not ordered. The environment of the streaming, with its notion of time window of the processing of data, imposes this responsibility. Mechanisms for management and representation of incoming facts and reasoning are therefore adapted to order said facts. The considerations of speed and volumetry of data involve optimization of the above operations. So it is indispensable to receive raw data, semantise them and exploit them within an inference mechanism in a time restraint, even if the data arrive at high speed and in very large numbers. Considering these two factors with the time constraint of the window of analysis of streams is ensured by a dynamic system for their intermediate storage. In this way, in some situations streams could be saved in main memory only whereas in other situations it will definitely be necessary to persist with them even temporarily in secondary memory.

For exploitation of databases of key/value type, which are adapted to storage in main memory and offer a high level of performance, the RDF triplets model has to be adapted to the key/value approach considered in general.

For the conversion of data into RDF triplets, an initial approach called "direct mapping" automatically generates RDF from names of tables for classes and from names of columns for properties. This approach quickly produces RDF from a relational database, but without using vocabulary.

The other approach supplies the R2RML mapping language for linking vocabulary terms to the scheme of the database. In the case of XML, generic XSLT transformation can be executed to produce RDF from a wide array of XML documents Viewing data (dataviz) is one of the keys of their use. It understands, analyses, monitors, and detects the key elements of the data. Above all, it lets the user interact with the datum and to perceive it physically. Many scientific works on viewing data have been and are being conducted in research laboratories. Many open-source components let an expert or semi-expert public understand and communicate their viewpoint on the data.

For example, data journalism (which is a movement aimed at renewing journalism by exploitation of statistical data and making these available to the public) is on the rise due to two major factors. First, providing the public with data (Open Data) for quickly accessing confidential data. Some of these data are accessible in the form of streams, but this movement tends to expand due to the arrival of the "internet of objects" and smart cities. This will allow access to data in data streams coming from sensors or other communicating objects. Second, the capacity to carry out appealing viewing has made discourse and argument clearer and more meaningful. The visual representation of static or relatively static data has reached a first degree of maturity. The use of extended SPARQL language lets the modular platform (4) also process the viewing of dynamic data and semantised streams.

The present application describes various technical characteristics and advantages in reference to the figures and/or various embodiments. The skilled person will understand that the technical characteristics of a given embodiment can in fact be combined with characteristics of another embodiment unless explicitly stated otherwise or it is evident that these characteristics are incompatible or the combination provides no solution to at least one of the technical problems mentioned in the present application. Also, the technical characteristics described in a given embodiment can be isolated from the other characteristics of this embodiment unless explicitly stated otherwise.

It must be evident for skilled persons that the present invention to enables embodiments in many other specific forms without departing from the field of application of the invention as claimed. Consequently, the present embodiments must be considered by way of illustration, but can be modified in the field defined by the scope of the attached claims, and the invention must not be limited to the details given hereinabove.

The invention claimed is:

1. A device for processing largescale data streams, comprising a knowledge base, a hardware and software assembly constituting a front-end communication device, for capturing the streams of the external medium and if needed restoring data to this medium, the front-end delivering the streams to a platform where said data streams undergo different processings, traces being collected and stored in a storage and memory architecture during execution of the processing operations, the platform produces data which supply a decision-making device comprising a hardware and software assembly defining decision rules for either triggering actions or initiating retroactions to the front-end communication device or to the knowledge base of said processing device,
    wherein a SPARQL request language is extended to perform summaries for data stream or implement oblivion functions for archiving data streams with a variable granularity as a function of time and ensuring limited storage space,
    wherein the SPARQL language is extended by introducing the notion of adaptable time window and operators specific to the stream processing, the requests processing data being adapted to the arrival rate of dynamic data and being evaluated continually to consider the scalable character of the stream, the semantics of SPARQL requests enabling processings based on time or the order of arrival of data.

2. The device according to claim 1, wherein the different processings comprise semantisation of the stream, or creation of a summary, or crossing of at least two streams or interconnection of several streams.

3. The device according to claim 2, wherein semantisation of streams conforms to an ontology of description of streams.

4. The device according to claim 2, wherein the interconnection of streams can include semantic reasoning.

5. The device according to claim 1, wherein the platform comprises a plurality of "smart' op" which are processing stream processes, these processes being scripted via scripting means to produce data supplying the decision-making device.

6. The device according to claim 1, wherein storing traces in the storage architecture lets the platform access these traces and perform repetitions of any sets or non-real-time processings.

7. The device according to claim 1, wherein all operations to which the streams are subjected contribute to the production of data.

8. The device according to claim 1, wherein the data can be alerts or singularities resulting from reasoning conducted on the streams.

9. The device according to claim 1, wherein the knowledge base contains information representing the knowledge of the external medium and comprises the description of sensors and infrastructure which supports said sensors.

10. The device according to claim 9, wherein this information constituting the knowledge can be modified by a retroaction triggered by decision rules.

11. The device according to claim 1, wherein the platform has a modular architecture for supporting the addition or replacement of components without recompilation, and enables deployment on a park of trivialized virtual machines, said platform being modularized by means of abstraction layers for encapsulating all access to services of the operating, storage or exchange system.

12. The device according to claim 11, wherein replacing implementations of said abstractions passes from simple implementations adapted to development to others focused on large-scale deployment.

13. The device according to claim 1, wherein the architecture of the platform adapts deployment of the system to the target volumetry and has it evolved in case of evolution, by simple addition of virtual machines if the selected components allow this or by replacing the components limiting scalability.

14. The device according to claim 1, wherein the extended SPARQL language involves data which can be either static or dynamic and temporal by interconnecting them, irrespective of their number, their sources or their qualities.

* * * * *